United States Patent
Ayala et al.

(10) Patent No.: US 7,904,350 B2
(45) Date of Patent: Mar. 8, 2011

(54) NETWORK-BASED SUPPLY CHAIN MANAGEMENT METHOD

(75) Inventors: Roberto Ayala, Yorktown Heights, NY (US); Michael P. Murray, Ridgefield, CT (US); Mauricio Alejandro Villalobos, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1069 days.

(21) Appl. No.: 09/910,544

(22) Filed: Jul. 20, 2001

(65) Prior Publication Data

US 2003/0018546 A1    Jan. 23, 2003

(51) Int. Cl.
  *G06Q 10/00* (2006.01)
  *G06G 1/14* (2006.01)
(52) U.S. Cl. .......................................... 705/28; 705/22
(58) Field of Classification Search .................. 705/28
  See application file for complete search history.

(56) References Cited

U.S. PATENT DOCUMENTS

| | | | | |
|---|---|---|---|---|
| 5,608,621 A | * | 3/1997 | Caveney et al. | 705/10 |
| 5,630,070 A | * | 5/1997 | Dietrich et al. | 705/8 |
| 5,712,989 A | * | 1/1998 | Johnson et al. | 705/28 |
| 5,893,076 A | * | 4/1999 | Hafner et al. | 705/28 |
| 5,914,878 A | * | 6/1999 | Yamamoto et al. | 700/106 |
| 5,971,585 A | * | 10/1999 | Dangat et al. | 700/102 |
| 5,974,395 A | * | 10/1999 | Bellini et al. | 705/9 |
| 6,119,102 A | * | 9/2000 | Rush et al. | 705/29 |
| 6,151,582 A | * | 11/2000 | Huang et al. | 705/8 |
| 6,167,380 A | * | 12/2000 | Kennedy et al. | 705/10 |
| 6,243,613 B1 | * | 6/2001 | Desiraju et al. | 700/104 |
| 6,260,024 B1 | * | 7/2001 | Shkedy | 705/37 |
| 7,003,474 B2 | * | 2/2006 | Lidow | 705/7 |
| 7,058,587 B1 | * | 6/2006 | Horne | 705/7 |
| 2002/0138316 A1 | * | 9/2002 | Katz et al. | 705/7 |
| 2002/0178077 A1 | * | 11/2002 | Katz et al. | 705/26 |
| 2002/0194057 A1 | * | 12/2002 | Lidow | 705/10 |
| 2002/0198757 A1 | * | 12/2002 | Hegde et al. | 705/8 |
| 2003/0033180 A1 | * | 2/2003 | Shekar et al. | 705/7 |
| 2003/0036933 A1 | * | 2/2003 | Shetty et al. | 705/7 |

* cited by examiner

*Primary Examiner* — F. Ryan Zeender
*Assistant Examiner* — Fahd A Obeid
(74) *Attorney, Agent, or Firm* — Cantor Colburn LLP; Derek Jennings

(57) ABSTRACT

An exemplary embodiment of the invention relates to a method for facilitating supply chain collaboration in a network environment, said supply chain including an enterprise and at least one supplier. The method includes generating and transmitting an unconstrained forecast to a supplier; receiving a supplier capability statement in response; and generating a constrained forecast utilizing the supplier capability statement. The constrained forecast is transmitted to the supplier which responds with a formal commitment to product a needed supply indicated in the constrained forecast.

The method also comprises monitoring inventory levels at a replenishment service center by a supplier based upon a formal commitment; refilling inventory items at the replenishment service center; and facilitating delivery of the inventory items to the enterprise site by transmitting a pull signal to the replenishment service center whereby inventory items are delivered in response to the pull signal.

18 Claims, 4 Drawing Sheets

NETWORK-BASED SUPPLY CHAIN MANAGEMENT METHOD

BACKGROUND

This invention relates generally to inventory management including supply assessment, commitment and replenishment processes, and more particularly, the present invention relates to a method for facilitating supply chain collaboration in a communications network environment.

Two problems facing supply chains today include: having insufficient quantities of materials on hand to satisfy customer demand which, in turn, can jeopardize a company's ability to do business, and having surplus inventory which is often derived from the effort undertaken to reduce the risks associated with not having enough materials. Having a surplus inventory causes a hold of cash and increases the risk of loss in assets due to factors such as obsolescence. Other causes of risk include unplanned or unexpected orders for goods, as well as order cancellations which may also impact inventory levels. It is more common, however, that factors not attributable to customer behavior are the cause of inventory management problems. Businesses are continuously striving to find new and better ways to improve their inventory management processes in order to reduce these business risks.

One of the reasons why current inventory management systems fail is due to ineffective demand forecasting methods and deficient supply replenishment processes utilized by supply management teams across many industries. Predicting future demand for goods and materials is fraught with uncertainties which are further fueled by dynamic economic conditions and fluctuating markets. This instability can make forecasting future supply needs especially difficult for the manufacturing industry. For example, if the manufacturer finds either an increased or reduced demand in the product compared to its forecast, strain is placed throughout the supply chain where overstocking or depletion of components can occur quickly. In addition, if the supplier cannot deliver the components, manufacturers will often not be able to react quickly to meet demand, seek alternative sources, etc. Without keeping large stock of components on hand at the manufacturer's site, supply problems occur readily. However, keeping large stock has additional problems of its own, such as higher storage costs, an increased loss probability because components become outdated, etc. Moreover, electronic parts tend to reduce in value with time (i.e., a part that the manufacturer purchases in January will cost less in March and much less in June and so on).

One solution developed to improve existing inventory management systems includes the establishment of storage warehouses or replenishment centers for facilitating quick and easy access to goods creating a buffer in the event of a sudden change in demand. Liability for maintaining and delivering these materials from the warehouse to the manufacturer typically remains with the supplier until a fixed point in time such as when the goods are ordered or a demand statement is issued by the purchasing manufacturer. The manufacturer benefits by reducing the costs associated with keeping inventory on hand and enhancing replenishment capabilities. By adding a third player (i.e., the warehouse) to the mix, however, additional problems in inventory management are presented. For example, coordinating supply requirements and forecasts, changes to these requirements, and their corresponding delivery schedules can be cumbersome and prone to error. Multi-party communications between supplier, warehouse, and buyer must be consistently accurate and reliable otherwise a breakdown in the supply chain can occur creating a 'chain effect' of inventory delays, and/or inaccuracies.

Software systems have been developed to address inventory replenishment problems utilizing various techniques. Internal Material Requirements Planning (MRP) or Enterprise Resource Planning (ERP) systems have been implemented to manage component supply and demand based on a forecast prepared by the manufacturer. As stated above, however, forecasts are imprecise, and often subject to change. In recent years, to better match actual production with forecasts calculated by the MRP system, a Just-in-Time (JIT) concept was developed. In a JIT environment, a network of phones and faxes is used to monitor each point in an assembly line where someone would be responsible for counting each set of components as they are assembled into a product (i.e. a manual pull system). Thereby, the responsible party would order additional components by phone or fax as components are running short. However, such JIT systems require constant monitoring, and still are highly dependent on accurate forecasts. Further, in a JIT environment when changes in demand are relayed through the supply chain from final product assemblers to the subassembly suppliers and ultimately to the component suppliers, even the slightest delay in communications can have a devastating impact on the integration and synchronization capabilities of the supply chain.

One popular trend in inventory management has evolved in an effort to alleviate some of the concerns associated with inventory management problems and is referred to as vendor managed inventory. Vendor managed inventory (VMI) solutions typically enable a retailer to downstream its inventory management processes to its suppliers in order to reduce the risks associated with surplus inventories and underages in inventory levels. VMI attempts to reduce these risks by monitoring retailer stock levels and planning inventory replenishment activities based upon forecast data and current stock figures.

While current VMI and software solutions provide some advantages in facilitating inventory management processes, they lack effective forecasting capabilities necessary to optimize inventory management goals. For example, supply collaboration solutions currently on the market do not factor constrained forecast data into the replenishment processes but instead utilize unconstrained forecasts which tends to result in an under-consumption of inventory, creating an unnecessary surplus. As the manufacturing world begins to move to build-to-order environment, greater demands are expected from the manufacturer to lower total costs in the complete supply chain, shorten throughput times, reduce stock to a minimum and provide more reliable delivery dates without constraining production due to supply issues.

BRIEF SUMMARY

An exemplary embodiment of the invention relates to a method for facilitating supply chain collaboration in a network environment, said supply chain including an enterprise and at least one supplier. The method includes generating and transmitting an unconstrained forecast to a supplier; receiving a supplier capability statement in response; and generating a constrained forecast utilizing the supplier capability statement. The constrained forecast is transmitted to the supplier which responds with a formal commitment to product a needed supply indicated in the constrained forecast.

The method also comprises monitoring inventory levels at a replenishment service center by a supplier based upon a formal commitment; refilling inventory items at the replenishment service center; and facilitating delivery of the inventory items to the enterprise site by transmitting a pull signal to the replenishment service center whereby inventory items are delivered in response to the pull signal.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
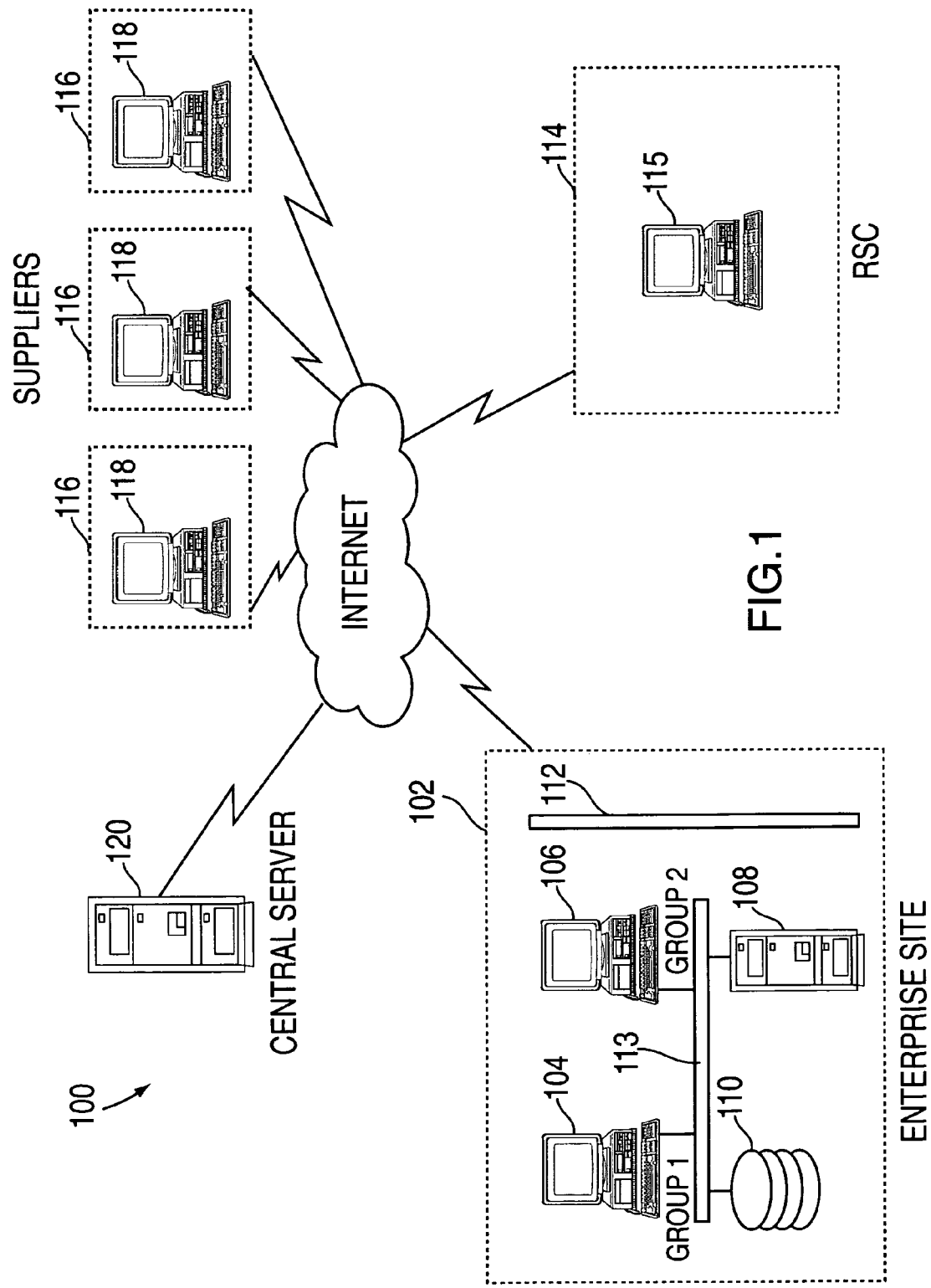
FIG. 1 illustrates a computer network system upon which the supplier collaboration tool is implemented in an exemplary embodiment.

In an exemplary embodiment, the supplier collaboration tool is implemented via a computer network system such as that depicted in FIG. 1. System 100 includes an enterprise site 102 which, for purposes of illustration, represents one of a plurality of electronics manufacturing facilities belonging to a business enterprise, although it will be understood that additional sites may be included in system 100 in order to realize the advantages of the invention. The business enterprise of FIG. 1 may be a large manufacturing company with manufacturing sites located all over the globe. Thus, enterprise site 102 represents one of the facilities operated by the business enterprise. Enterprise site 102 comprises divisions or groups which share requirements for common materials with similar divisions or groups from other sites associated with the business enterprise. Enterprise site 102 includes a client system 104 which represents a first manufacturing division (also referred to as group 1) within enterprise site 102. The terms 'group' and 'division', are synonymous and signify a product, commodity, or specialty manufacturing group associated with a business enterprise which share some common tasks or business objectives. For example, in a manufacturing environment, one group may be Consumer Products, and a second group may be High Technology Products. Thus, client system 106 signifies a second group for enterprise site 102. Client systems 104 and 106 request applications and data via a server 108 via what is commonly referred to in the art as a client/server architecture. It will be understood that any number of client systems and/or groups may be employed by enterprise site 102. Server 108 executes the business enterprise's Material Requirements Planning (MRP) and/or Enterprise Resource Planning (ERP) applications, among other tools or applications suites desired. Applications such as web server software and groupware applications are executed by server 108 for facilitating communications within site 102 as well as between site 102 and external entities. Further server 108 is executing database management software for communicating with data storage device 110. Data storage device 110 serves as a repository for a range of databases and data utilized by site 102 and which will be further explained herein. A communications link 113 is also included in site 102 which allows client systems 104 and 106, data storage device 110, and server 108 to communicate with another. Communications link 113 may be a high speed local area network such as an Ethernet, token ring, or OSI model network. In a system where more than one site 102 exist, a wide area network (WAN) linking sites together via routers, gateways, or similar software and/or hardware devices may be employed. A firewall 112 filters out unauthorized communication attempts by external entities and provides data integrity of system resources of site 102.

Central server 120 is also included in system 100 and provides a centralized system and location for directing and coordinating the activities implemented by the supplier collaboration tool as well as other system resources desired by the business enterprise. Server 120 may be a collection of high powered computers employing multiple processors, including scalable memory and high speed capabilities. Server 120 is preferably executing applications including a central MRP engine, an optimization tool, and the supplier collaboration tool of the invention. Specifically, central server 120 receives projected forecast data from various groups of a business enterprise which may span several enterprise site locations. Server 120 aggregates and synthesizes the forecast data, and then generates an unconstrained group level forecast that is transmitted back to associated suppliers for further action. Responses received by these suppliers are further exploited by server 120 resulting in the generation of a constrained forecast which is transmitted to suppliers at the individual site level. Commitment responses received from suppliers are processed and a site specific build plan is generated and implemented via the supplier collaboration tool. Modifications to build plans are effectuated when desirable via the supplier collaboration tool and supply replenishment activities are carried out accordingly. These processes are further described herein in FIGS. 2 through 4.

Replenishment service center (RSC) 114 provides local storage of supplier goods and inventory under an agreement with site 102. RSC 114 may be a warehouse or commercial storage facility. In one embodiment, RSC 114 includes client system 115 which is Internet-enabled and which operates web browser software for communicating with site 102 and suppliers 116. RSC 114 executes a warehouse management tool for managing its inventory processes and replenishment activities according to agreements established between RSC 114, suppliers 116, and enterprise site 102, as well as replenishment plans developed by the supplier collaboration tool. The WMS tool is described further in FIG. 3. Client system 115 includes data storage for housing records generated by activities conducted via the supplier collaboration tool. RSC 114 receives requests for goods and data related to inventories from enterprise site 102 and/or suppliers 116.

Suppliers 116 provide goods to enterprise sites for a business enterprise and may be geographically dispersed around the globe. Suppliers 116 include client systems 118 which are Internet-enabled and operate web browser software. Alternatively, a client/server architecture may be employed by RSC 114 and/or suppliers 116 in order to achieve the advantages of the present invention. Such network architectures are commonly employed in business and will be appreciated by those skilled in the art.

RSC 114 is strategically located in close proximity to site 102 in order to provide quick inventory deliveries as needed. RSC 114 may also be responsible for servicing additional sites of the business enterprise that are also located nearby in addition to site 102 if desired. Suppliers 116 provide goods to site 102 via RSC 114 based upon demand requirements of and/or agreements with site 102. Suppliers 116 ensure adequate supply levels of goods at RSC 114 via network communications facilitated by the supplier collaboration tool as will be described further herein.

In an exemplary embodiment, supplier collaboration is provided via a shared communications infrastructure; namely, a trade network environment. The supplier collaboration tool is executed within a computer network system such as system 100 of FIG. 1. This tool features two processes referred to as a forecast collaboration process and a replenishment execution process. The forecast collaboration process is further broken down into subprocesses referred to as 'try for fit' and 'forecast/commit' as described in FIG. 2. The replenishment execution process is further broken down into an 'inventory management' sub-process and a 'pull' sub-process as described in FIGS. 3 and 4 respectively.

Figure 2:
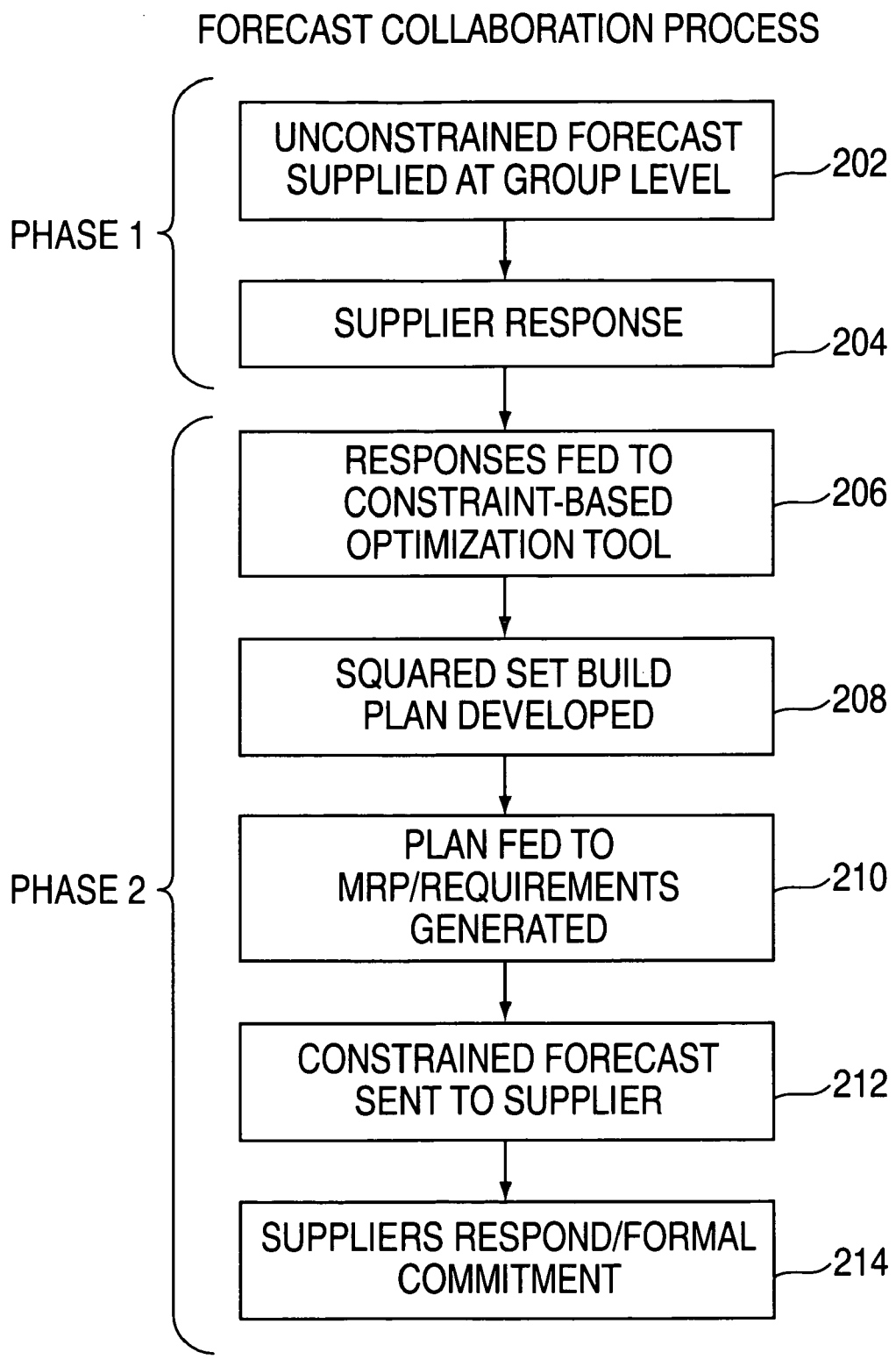
FIG. 2 is a flowchart describing the implementation of the forecast collaboration process of the supplier collaboration tool.

FIG. 2 describes the two phase forecast collaboration process utilizing the supplier collaboration tool. The forecast collaboration process involves communicating material requirements forecasts to suppliers in order for them to assess their supply capabilities against that forecast and to communicate those capabilities back to the business enterprise. This process may be repeated as often as necessary in order to achieve accurate collaborative planning results. Phase 1 is referred to as the 'try for fit' sub-process of the supplier collaboration tool whereby suppliers are provided with an unconstrained forecast (step 202), to which each supplier responds with a best-can-do supply capability statement (herein referred to as 'supply capability statement'), at step 204. The unconstrained forecast represents an aggregated demand or projected forecast received from a particular group which may be scattered among a plurality of enterprise site locations. In other words, if there are multiple physical sites for the business enterprise which employ a particular manufacturing group, then the unconstrained forecast is aggregated and provided to each supplier at the business enterprise group level to which each supplier will respond with a supply capability statement. For example, group 1 submits a demand for 1,000 widgets of which 400 were requested by a first enterprise site such as enterprise site 102 of FIG. 1 and 600 were requested by a second enterprise site (not shown). An unconstrained forecast includes the aggregated customer demand exploded into time-bucketed materials requirements, without taking into consideration any resource constraints. The unconstrained forecast is assembled via a central materials resource planning (MRP) engine and provided to suppliers over the web at step 202. At step 204, suppliers provide their supply capability responses for the unconstrained forecast to the originating group via the web. Supply capability represents the greatest amount of inventory a supplier can make available to the buyer in order to satisfy the buyer's demand over a specified time period.

In phase 2 of the forecast collaboration process, the responses received from the suppliers are fed into a centralized constraint-based optimization tool at server 120 (step 206) to square sets and add capacity constraints in what is referred to as a 'forecast/commit' sub-process. The optimization tool may be a planning tool that implodes component data, tracing it through a manufacturing cycle up to its final product while factoring in constraints and/or business rules. This process is referred to herein as 'squared set analysis'. Examples of constraints used by the optimization tool may include manufacturing capacity and limited availability of components. Square sets represent an exploded demand after obtaining optimized volumes, thereby avoiding the need to generate a demand for components that will not be consumed. Based on the results of this squared set analysis, server 120 will produce a squared set build plan which is sent to the MRP engine to generate requirements for a squared set constrained forecast at step 210. The resulting constrained forecast should be equal to or less than the unconstrained forecast, taking into consideration all resource constraints, and limiting the constrained forecast to the most limiting constraints. This resulting constrained forecast is provided via the web to only those suppliers identified at the site level at step 212, who then respond with a formal commitment also at the site level at step 214. This formal commitment from the suppliers reflects what they will build to.

Figure 3:
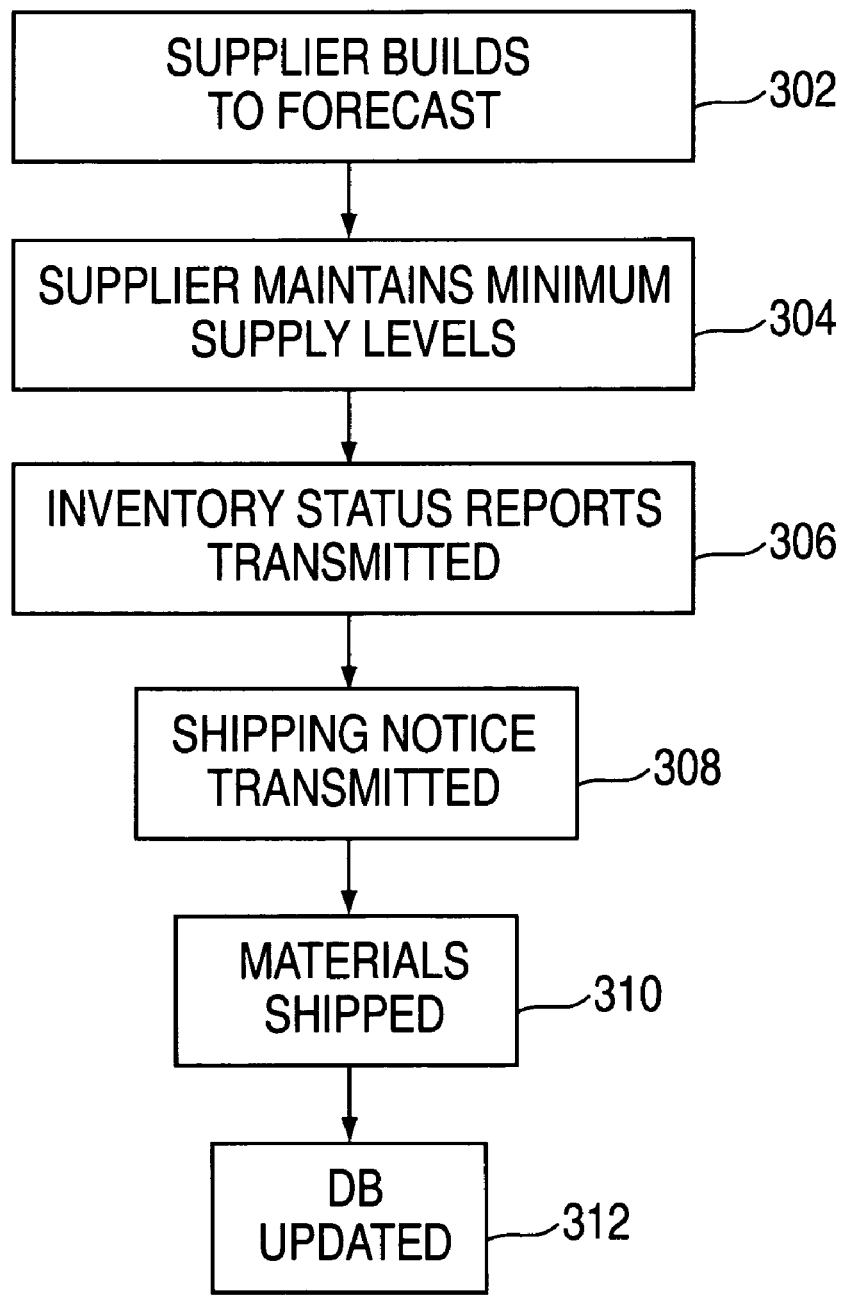
FIG. 3 is a flowchart describing the inventory management sub-process of the replenishment execution process of the supplier collaboration tool.
Figure 4:
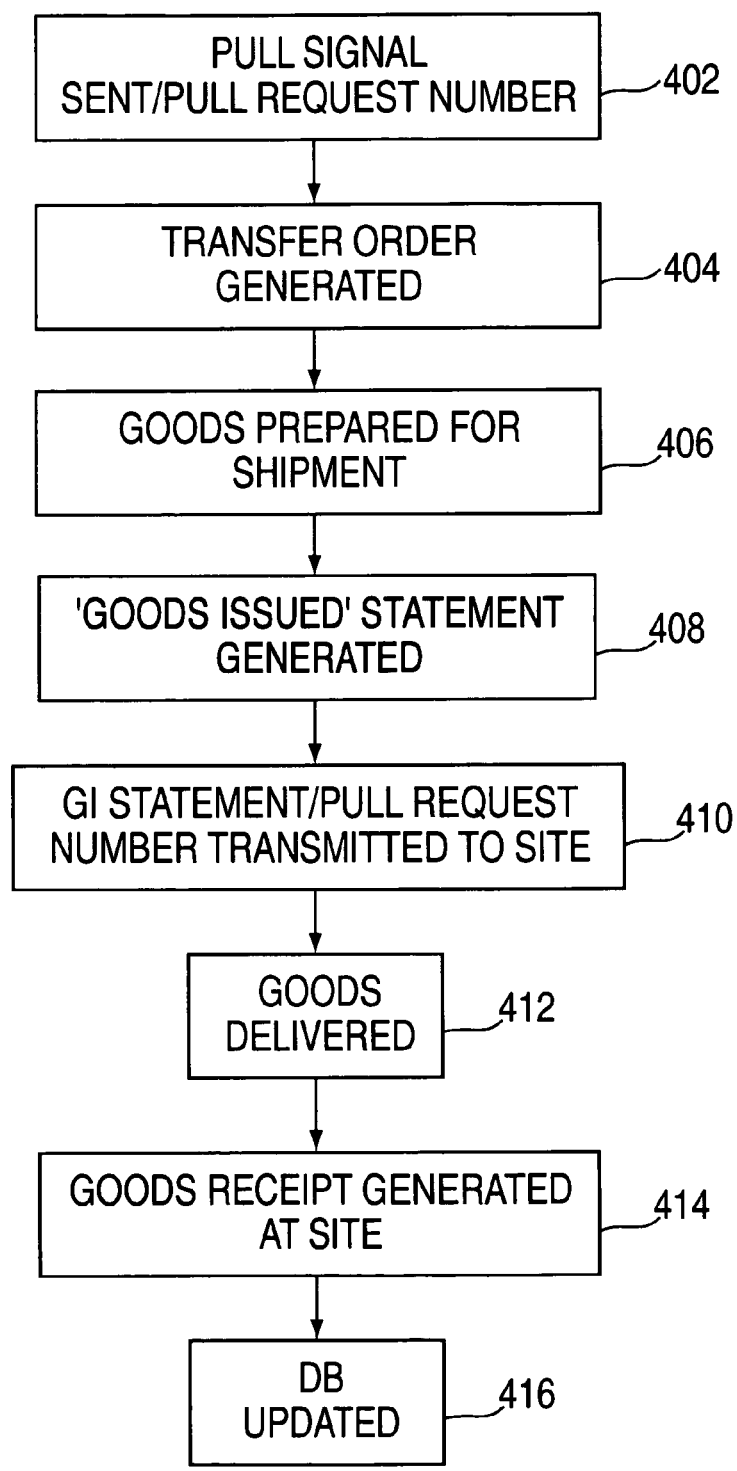
FIG. 4 is a flowchart describing the 'pull' sub-process of the replenishment execution process of the supplier collaboration tool.

FIGS. 3 and 4 illustrate the replenishment execution process of the supplier collaboration tool which provides enterprise sites, RSC providers, and suppliers with the end-to-end visibility of inventory that is necessary to insure the flow of the right material to each site in the needed quantities. The process provides visibility to materials in transmit from a supplier site to the enterprise RSC, materials at each RSC, and materials in transit from each RSC to the respective enterprise site. It also facilitates a pull replenishment model versus a push model, in order to minimize enterprise owned inventory levels.

The inventory management sub-process of FIG. 3 illustrates the supplier side activities of the replenishment execution process. Suppliers agree to build to the forecasts that they committed to during the forecast/commit process at step 302. Additionally, suppliers agree to maintain a minimum supply level usually measured in terms of days of supply (DOS) at each enterprise site's RSC at step 304. For example, a supplier may agree to continuously maintain ten days of supply at the RSC. Inventory levels are measured in DOS by rationalizing actual units of inventory, against expected consumption (constrained forecast). At step 306, each supplier monitors the inventory levels in each RSC and refills it as needed to maintain the agreed level of inventory buffer. In order for each supplier to have visibility to the RSC inventory levels, an inventory status is provided to them by the RSC warehouse management system (WMS) at step 306. The WMS is an application used by the RSC to manage their inventories. The enterprise also likes to maintain visibility to the RSC inventory levels as a control measure, and therefore also receives an inventory status from the RSC WMS. Each time the supplier ships materials to each RSC, either they, or the logistics provider must provide an advance ship notice with shipping information to both the RSC and the enterprise site to provide visibility of the materials in transit at step 308. Materials are subsequently shipped to the site at step 310 and the WMS updates it to reflect the shipment at step 312.

FIG. 4 illustrates the enterprise level activities initiated by the site via the pull sub-process of the replenishment execution process. The enterprise site will pull materials as needed (e.g., 1-4 times per day) from the RSC by sending a pull signal to the RSC at step 402. A pull signal is a request for parts (i.e., transfer order) by the enterprise site to the RSC, asking the RSC provider to pick the requested parts and to deliver them to the RSC warehouse management system (WMS) which then creates the transfer order for the warehouse operators at step 404. Each pull signal has a pull request number. After the materials are picked and packed for delivery at step 406, a Goods Issued (GI) document is created at step 408 containing the pull request number, and provided to the enterprise at step 410, giving the enterprise visibility that the requested parts are on the way. Once the parts are delivered to the enterprise site at step 412, they are then received by creating a goods receipt (GR) at step 414. To create a GR, the pull request number must be reconciled in order for the materials to be debated to the enterprise WMS at step 416.

Combining supply assessments or forecast/commit processes with traditional replenishment processes (i.e., execution of pull signals and goods issues) into days of supply offers benefits to supply chain partners in the way of common visibility of demand and supply re-balancing, capacity optimization, inventory reduction, premium transportation expense reduction, and minimization of inventory stock outs.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for facilitating supply chain collaboration over a network including a processor, the supply chain including an enterprise, enterprise sites, and at least one supplier, wherein the processor performs the method comprising:
   aggregating demand received, at a central server of the enterprise, from a plurality of enterprise sites associated with the enterprise, the demand comprising materials requirements; wherein each of the plurality of enterprise sites comprises divisions that share common material requirements with divisions from others of the plurality of enterprise sites, the common material requirements for each of the divisions corresponding with a product or commodity;
   generating, using a material requirement planning system (MRP) located at an enterprise site, an unconstrained forecast resulting from the aggregating, the unconstrained forecast generated at a product or commodity level, wherein the unconstrained forecast represents at least one of an aggregated demand and a projected forecast received from a group scattered among the plurality of enterprise sites, and wherein the unconstrained forecast does not take into consideration any resource constraints;
   transmitting the unconstrained forecast over the network to each of the suppliers that service the enterprise sites for which the unconstrained forecast is generated;
   receiving supplier capability statements over the network, the supplier capability statements received by the division at each of the enterprise sites from corresponding suppliers in response to the transmitting;
   performing, using the central server, a squared set analysis by generating square sets and adding capacity constraints to the unconstrained forecast by imploding component data related to the unconstrained forecast and tracing the component data through a manufacturing cycle while factoring at least one of constraints and business rules, wherein square sets represent an exploded demand for the components, wherein the square sets thereby avoid generation of demand for components that will not be consumed;
   based on the results of the squared set analysis, generating, using the central server, a squared set build plan that is site-specific build plan for each of the plurality of enterprise sites associated with the enterprise;
      based on the results of the squared set build plan, generating, using the MRP system, a constrained forecast, wherein the constrained forecast is at least one of equal or less than the unconstrained forecast, and wherein the constrained forecast takes into consideration all resource constraints and limits the constrained forecast to most limiting constraints;
      receiving a formal commitment from the suppliers that service the enterprise sites;
      transmitting the constrained forecasts to the suppliers at an enterprise site level over the network, wherein the constrained forecasts are sent to only the suppliers who provided the formal commitment;
   monitoring inventory levels at a replenishment service center by said at least one supplier based upon said formal commitment;
      refilling inventory items at said replenishment service center according to said formal commitment;
      facilitating delivery of said inventory items to a site location for said enterprise by transmitting a pull signal to said replenishment service center; and
      receiving said inventory items in response to said pull signal.

2. The method as recited in claim 1 further comprising:
   receiving, from said at least one supplier, a formal commitment to produce a needed supply indicated in said constrained forecast.

3. The method as recited in claim 1 further comprising:
   receiving, from said at least one supplier, a communication when said at least one supplier is unable to produce a needed supply indicated in said constrained forecast.

4. The method of claim 1, wherein the unconstrained forecast is generated via a centralized material resource planning engine at the enterprise.

5. The method of claim 1, wherein generating the unconstrained forecast includes exploding the aggregated demand into time-bucketed materials requirements at the product or commodity level.

6. The method of claim 1, wherein the unconstrained forecast is transmitted to each of the suppliers via the world wide web.

7. The method of claim 1, wherein the supplier capability statements include a greatest amount of materials each of the suppliers is able to make available to the division.

8. The method of claim 1, wherein the generating a constrained forecast includes:
   inputting the supplier capability statements into a centralized constraint-based optimization tool at the central server, the centralized constraint-based optimization tool performing squared set analysis and applying capacity constraints;
   producing the squared set build plan from results of the squared set analysis; and
   inputting the squared set build plan into a materials resource planning tool for processing, the results of the processing used in generating the constrained forecast.

9. The method of claim 8, wherein squared sets resulting from the squared set analysis include an exploded demand including optimized volumes.

10. The method of claim 8, wherein the performing squared set analysis further comprises imploding component data, tracing the component data through a manufacturing cycle up to a final product while factoring in at least one of constraints and business rules.

11. A non-transitory storage medium encoded with machine-readable computer program code for facilitating supply chain collaboration over a network, the supply chain including an enterprise, enterprise sites, and at least one supplier, the storage medium including instructions for causing a computer to implement a method comprising:

aggregating demand received, at a central server of the enterprise, from a plurality of enterprise sites associated with the enterprise, the demand comprising materials requirements; wherein each of the plurality of enterprise sites comprises divisions that share common material requirements with divisions from others of the plurality of enterprise sites, the common material requirements for each of the divisions corresponding with a product or commodity;

generating, using a material requirement planning system (MRP) located at an enterprise site, an unconstrained forecast resulting from the aggregating, the unconstrained forecast generated at a product or commodity level, wherein the unconstrained forecast represents at least one of an aggregated demand and a projected forecast received from a group scattered among the plurality of enterprise sites, and wherein the unconstrained forecast does not take into consideration any resource constraints;

transmitting the unconstrained forecast over the network to each of the suppliers that service the enterprise sites for which the unconstrained forecast is generated;

receiving supplier capability statements over the network, the supplier capability statements received by the division at each of the enterprise sites from corresponding suppliers in response to the transmitting;

performing, using the central server, a squared set analysis by generating square sets and adding capacity constraints to the unconstrained forecast by imploding component data related to the unconstrained forecast and tracing the component data through a manufacturing cycle while factoring at least one of constraints and business rules, wherein square sets represent an exploded demand for the components, wherein the square sets thereby avoid generation of demand for components that will not be consumed;

based on the results of the squared set analysis, generating, the central server, a squared set build plan that is site-specific build plan for each of the plurality of enterprise sites associated with the enterprise;

based on the results of the squared set build plan, generating, using the MRP system, a constrained forecast, wherein the constrained forecast is at least one of equal or less than the unconstrained forecast, and wherein the constrained forecast takes into consideration all resource constraints and limits the constrained forecast to most limiting constraints;

receiving a formal commitment from the suppliers that service the enterprise sites;

transmitting the constrained forecasts to the suppliers at an enterprise site level over the network, wherein the constrained forecasts are sent to only the suppliers who provided the formal commitment;

monitoring inventory levels at a replenishment service center by said at least one supplier based upon said formal commitment;

refilling inventory items at said replenishment service center according to said formal commitment;

facilitating delivery of said inventory items to a site location for said enterprise by transmitting a pull signal to said replenishment service center; and receiving said inventory items in response to said pull signal.

12. The storage medium of claim 11, wherein the unconstrained forecast is generated via a centralized material resource planning engine at the enterprise.

13. The storage medium of claim 11, wherein generating the unconstrained forecast includes exploding the aggregated demand into time-bucketed materials requirements at the product or commodity level.

14. The storage medium of claim 11, wherein the unconstrained forecast is transmitted to each of the suppliers via the world wide web.

15. The storage medium of claim 11, wherein the supplier capability statements include a greatest amount of materials each of the suppliers is able to make available to the division.

16. The storage medium of claim 11, wherein the generating a constrained forecast includes:

inputting the supplier capability statements into a centralized constraint-based optimization tool at the server, the centralized constraint-based optimization tool performing squared set analysis and applying capacity constraints;

producing the squared set build plan from results of the squared set analysis; and inputting the squared set build plan into a materials resource planning tool for processing, the results of the processing used in generating the constrained forecast.

17. The storage medium of claim 16, wherein squared sets resulting from the squared set analysis include an exploded demand including optimized volumes.

18. The storage medium of claim 16, wherein the performing squared set analysis further comprises imploding component data, tracing the component data through a manufacturing cycle up to a final product while factoring in at least one of constraints and business rules.

* * * * *